U. L. Leete,
Tailors' Pattern.
No. 107,068.    Patented Sep. 6, 1870.
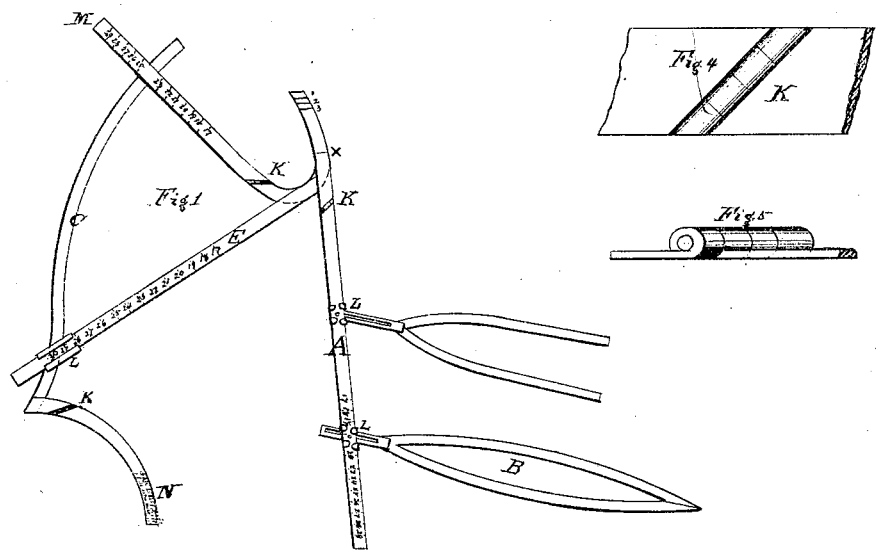
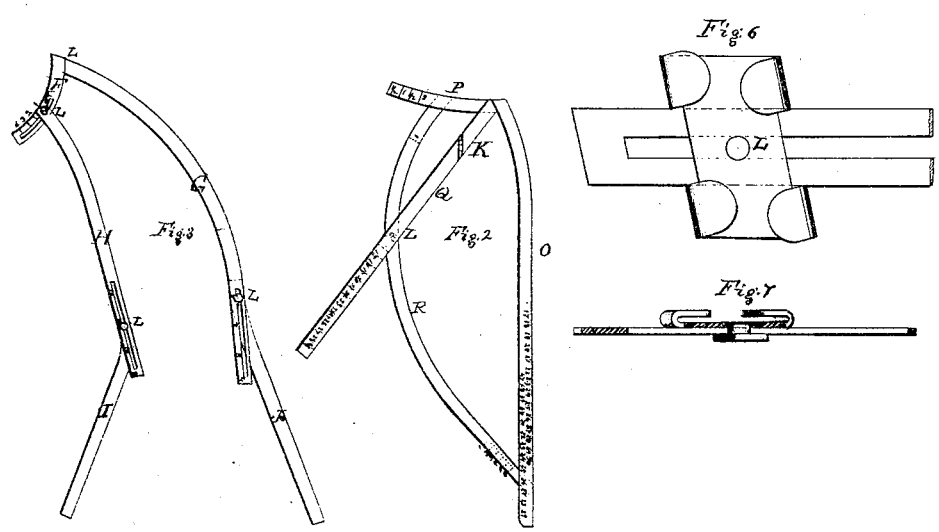
Witnesses
Thos. G. Sloan
Edwin M. Cowgell
Inventor
Ursula L. Leete

United States Patent Office.

URSULA L. LEETE, OF OWEGO, NEW YORK.

Letters Patent No. 107,068, dated September 6, 1870.

INSTRUMENT FOR DRAUGHTING GARMENTS.

The Schedule referred to in these Letters Patent and making part of the same

I, URSULA L. LEETE, of Owego, the county of Tioga, State of New York, have invented certain Improvements in Instruments for Draughting Ladies' Dresses, of which the following is a specification.

Nature and Objects of the Invention.

My invention is an improvement upon the device patented to H. A. Fowler, May 13, 1862; and It consists—

First, in connecting the shoulder rule and dart forms of the waist-front measuring device to the main rules by a sliding pivot, and the back-form or rule of fig. 2 to the main rule by a pivot, and Second, in a device for laying out the side pieces of a waist.

Description of the Accompanying Drawing.

Figure 1 is a view of the instrument for laying out the front of upper garments;

Figure 2, a view of the instrument for determining the side seam of the front;

Figure 3, a view of the instrument for laying out the side piece and its frill or skirt;

Figure 4, a top view of the hinge, by which the rules are jointed to fold;

Figure 5, an edge view of same;

Figure 6, a top view of the sliding pivoted connection; and

Figure 7, a side view of same.

General Description.

The device of Fowler embodies the general features of my implements for laying out the front and back portions of dress-waists, but does not comprehend nor furnish a substitute for my device for laying out the side pieces (those which connect the front and back) of a basque. In the practical operation of Fowler's device it is impossible to delineate any other than the same relative curve to the main rules by those which are connected to them. This is found to be necessary to the perfect fitting of a garment, and is provided for in my device by the pivots which connect the rules to the slide which unites them, which feature enables me not only to accomplish all the adjustments of which the old device is capable, but to change the relative direction of the rules to the main piston of the instrument.

In fig. 1—

A is the main or chest-rule from which the others depend.

To its upper end is fixed the curved arm-size rule M, and at a point near the curve of this arm-size rule is attached a supporting rule, E, upon which slides the shoulder-bar or rule C. This shoulder-rule is of peculiar shape, and carries at its lower end the neck-rule N. It is pivoted to a slide which moves upon the rule E, by which means it is adjusted to its proper position, distant from the main rule A, and relatively to the arm-size rule M.

The dart forms B B move on pivots projecting from slides L, which move on the main rule A. They are capable of three adjustments, viz.: to any position on rule A, at the desired angle thereto, and a proper distance therefrom.

In fig. 2 a main rule, O, (shoulder rule,) has affixed at its upper end at nearly a right angle a slightly curved arm-rule, P, and from the junction of these two, equidistant therefrom, depends a chest-rule, Q to which is pivoted the back-form or rule R. This back form vibrates to any position on the main rule O.

In fig. 3 a main rule, G, has affixed at its top a curved arm-rule, F, to which is attached, by means of a pivot sliding in a slot, a rule, H. To these rules G H, at their lower ends, the frill or skirt-rules J I are attached, so as to swing on pivots vertically adjustable in suitable slots.

The several rules are graduated to a scale ascertained by experiment and practice, and governed by the measurements of the body of the person to be fitted.

For convenience of packing, the rules are provided with hinges at suitable points, by which means they are folded into a small space.

Operation.

To draught the front of a basque, ascertain the shoulder measure, arm-pit to waistband, around the waist, and around the hips, by means of a common tape-measure. Assuming them to be respectively, 22, 7½, 23, and 30, which correspond to the minimum measurements of ladies, first fold the cloth and draw a line 2½ inches from and parallel with its edge, to compensate for the turned-in portion at the fastening opening. Set the shoulder-rule C to Figure 22, (shoulder measure,) on rule E. Place the instrument thus set upon the line drawn upon the cloth, so that figs. 22, on the neck-rule N and chest-rule A will be coincident therewith. Mark out the darts, fixing their position by the experienced eye, so as to determine the fulness of the waist. Mark arm-size from fig. 22 around to fig. 1, which latter corresponds to the minimum measurements. Move the shoulder-rule on its pivot, so that its long arm shall intersect fig. 22 on arm-size rule M, and mark along its edge from fig. 22, on neck-rule, to the line just made for the arm-size. This gives the neck and shoulder lines.

With a straight rule, (scale of inches, the back of main rule C, fig. 2, is thus graduated,) make a dot 7½ inches (arm-pit to waistband measure) from x, on arm-rule M, parallel with edge of cloth, from which a line is drawn at right angles to intersect it. This line is ten inches long (the corresponding length for this size of waist) and projects beyond the dot. Remove rule fig. 1, and place the corner of rule fig. 2 at the end of arm-size line, and bring the edge of its long arm to the end of waist-line, and draw a line along its edge, which corresponds to the side seam under the arm. Extend the front line four inches and the back line six inches, and connect their ends with a curved line. This gives the frill or skirt of the basque, which may be varied by the eye, according to the shade of the hips of the person, and completes one-half of the front of a basque garment. The other half is a reverse duplicate of this.

To draught the back, double the cloth and place fig. 22 (inside scale) of rule O, fig. 2, at the corner of folded cloth, and fig. 22, of chest-rule Q, on the folded edge. Mark from o, on arm-size P, around outside of shoulder-rule O to fig. 22, (outside scale.) Draw a line from fig. 22, last point, to edge of folded cloth for neck. Turn over the instrument and place fig. 1 (upper scale on back of rule R) at the end of the line forming the arm-scye, and bring fig. 2½ (lower scale of rule R) 1½ inch from edge of folded cloth, and draw a line. For back of frill or skirt mark a line eight inches from center of bottom of waist, and one seven inches from outer edge of bottom of waist, at such angles that their extremities shall be four inches apart. This completes the back.

To draught the side pieces with rule fig. 3, place the pivot at fig. 1 in slot of arm-rule F, and the pivots of rules J I at 7½ and 7 of the rules G H; move the rule H so that its end shall be three inches from that of G. Move the rules I J so that their ends shall be eight inches apart, and equidistant from an imaginary line drawn midway between the rules G H, and form a point seven inches from the pivot of J, and six inches from that of I, connect the two by a curved line. Complete the figure by a line around the outside of the instrument as adjusted, and the side piece is complete. Its reverse duplicate forms the other side piece, and when all are connected at proper points with suitable seams, a basque garment is produced, fitting a person whose measurements are those to the scale of which this pattern is drawn.

Claims.

1. The instrument herein described for draughting the front of an upper garment, having its shoulder-rule C and dart forms B B connected to the main rules by a slide and pivot, for the purpose set forth.

2. The instrument for draughting the back of an upper garment, having its rule R pivoted to the main rule, as shown and described.

3. The implement for draughting the side pieces, consisting of the main rule G, arm-rule F, pivoted rule H, and pivoted sliding rules I J, the whole arranged and graduated as described.

URSULA L. LEETE.

Witnesses:
THOS. G. SLOAN,
EDWIN M. CORYELL.